United States Patent
Stackhouse

(10) Patent No.: US 11,910,759 B2
(45) Date of Patent: Feb. 27, 2024

(54) MULTIPURPOSE BARRIER AND GARDENING SYSTEM FOR PLANTATION

(71) Applicant: Kenneth Stackhouse, Lake Ariel, PA (US)

(72) Inventor: Kenneth Stackhouse, Lake Ariel, PA (US)

(*) Notice: Subject to any disclaimer, the term of this patent is extended or adjusted under 35 U.S.C. 154(b) by 0 days.

(21) Appl. No.: 17/739,311

(22) Filed: May 9, 2022

(65) Prior Publication Data
US 2022/0394939 A1    Dec. 15, 2022

Related U.S. Application Data

(60) Provisional application No. 63/209,170, filed on Jun. 10, 2021.

(51) Int. Cl.
*A01G 13/02* (2006.01)
*A01G 9/28* (2018.01)

(52) U.S. Cl.
CPC .......... *A01G 13/0237* (2013.01); *A01G 9/28* (2018.02)

(58) Field of Classification Search
CPC ....... A01G 13/02; A01G 13/0237; A01G 9/28
See application file for complete search history.

(56) References Cited

U.S. PATENT DOCUMENTS

| | | | |
|---|---|---|---|
| 397,732 A * | 2/1889 | Landis | A01G 9/28 47/33 |
| 425,890 A * | 4/1890 | Landis | A01G 9/28 47/33 |
| 440,141 A * | 11/1890 | Dearborn | A01G 9/28 47/33 |
| 619,352 A * | 2/1899 | Schaefer | A01G 9/28 47/33 |
| 2,184,904 A * | 12/1939 | Boehme | A01G 9/28 47/33 |

(Continued)

FOREIGN PATENT DOCUMENTS

| | | | | |
|---|---|---|---|---|
| CA | 2476003 A1 * | 7/2005 | | A01G 1/08 |
| DE | 3622427 A1 * | 7/1985 | | |

(Continued)

OTHER PUBLICATIONS

Metre, M. b. (Apr. 6, 2020). Corten Steel Garden Edging. Retrieved from Metal by the Metre and bolts by the bag: https://metalbythemetre.com.au/product/allgal-50-x-50-x-1-6mm-steel-fence-posts-2-4-metres-long-2-2/ (Year: 2020).*

*Primary Examiner* — Monica L Perry
*Assistant Examiner* — Aaron M Rodziwicz
(74) *Attorney, Agent, or Firm* — Brennan, Manna & Diamond, LLC

(57) ABSTRACT

A barrier and gardening tool for forming a safe barrier around the base of a tree, raised garden, plant, or flower area. The tool is an open cylindrical barrier made by fastening two semi-circular body portions or members using stakes. The tool has flag holes for attaching small flags and other decorations thereto. The tool is positioned around a wall for protecting the flower area and in the form of a multi-tiered architecture for protecting trunk and roots of a tree while providing protected space for growing plants, flowers, plants, shrubs and more. The tool is made of non-toxic, durable, and corrosion-resistant material and is used as a temporary or permanent enclosure.

20 Claims, 6 Drawing Sheets

(56) References Cited

U.S. PATENT DOCUMENTS

| | | | | |
|---|---|---|---|---|
| 2,782,561 | A * | 2/1957 | Smith | A01G 13/0237 47/33 |
| 3,315,752 | A * | 4/1967 | Pasquini | A01G 9/28 47/33 |
| 3,343,301 | A * | 9/1967 | Adelman | E02D 29/02 47/33 |
| 3,438,146 | A * | 4/1969 | Nickerson | A01G 9/28 47/33 |
| 3,545,128 | A * | 12/1970 | La Fontaine | A01G 9/28 47/33 |
| 4,700,507 | A * | 10/1987 | Allen | A01G 13/0243 47/32.4 |
| 4,809,460 | A * | 3/1989 | Futch | A01G 9/28 47/33 |
| 4,932,157 | A * | 6/1990 | Shimp | E01F 15/0469 47/33 |
| 4,976,063 | A * | 12/1990 | Young | A01G 9/28 47/33 |
| 4,995,191 | A * | 2/1991 | Davis | A01G 29/00 47/32.7 |
| 5,383,302 | A * | 1/1995 | Hill | A01G 13/0237 47/33 |
| 5,479,741 | A * | 1/1996 | Underwood | A01G 13/0237 47/32.4 |
| 5,806,249 | A * | 9/1998 | Helms | A01G 9/28 47/33 |
| 6,625,925 | B1 * | 9/2003 | Foster | A01G 9/28 47/33 |
| 6,854,221 | B1 * | 2/2005 | Michaels | E02D 29/025 52/585.1 |
| 6,944,998 | B1 * | 9/2005 | King | B44F 9/04 47/33 |
| 7,478,501 | B2 * | 1/2009 | Wilbanks, Jr. | A01G 9/12 47/33 |
| 9,974,240 | B1 * | 5/2018 | Brinner | A01G 9/28 |
| 2005/0160686 | A1 * | 7/2005 | Williams | A01G 9/28 47/33 |
| 2005/0193647 | A1 * | 9/2005 | Jones | A01G 9/28 52/169.1 |
| 2006/0096169 | A1 * | 5/2006 | Love | A01G 9/28 47/10 |
| 2009/0235581 | A1 * | 9/2009 | Bevins | A01G 13/00 47/32.5 |
| 2010/0186292 | A1 * | 7/2010 | Hall | A01G 9/28 47/33 |
| 2012/0311927 | A1 * | 12/2012 | Bolin | A01G 9/28 47/33 |
| 2013/0047501 | A1 * | 2/2013 | Buck | A01G 9/28 47/33 |
| 2013/0125456 | A1 * | 5/2013 | Strubel | A01G 13/0237 47/32.7 |
| 2014/0026476 | A1 * | 1/2014 | Murphy | A01G 9/28 47/33 |
| 2017/0188525 | A1 * | 7/2017 | Paige, Sr. | A01G 29/00 |
| 2017/0303480 | A1 * | 10/2017 | Kumar | A01G 9/28 |
| 2017/0339835 | A1 * | 11/2017 | Measday | A01G 9/28 |
| 2018/0228102 | A1 * | 8/2018 | Centeno | A01G 9/28 |
| 2018/0255714 | A1 * | 9/2018 | Brinner | A01G 9/28 |
| 2019/0133053 | A1 * | 5/2019 | Dervin-Stathes | F16C 11/12 |
| 2021/0084838 | A1 * | 3/2021 | Volin | F21S 9/035 |
| 2021/0112731 | A1 * | 4/2021 | Fischer | A01G 9/28 |
| 2021/0235637 | A1 * | 8/2021 | Zhen | A01G 9/02 |
| 2021/0259164 | A1 * | 8/2021 | Centeno | A01G 9/02 |
| 2022/0095551 | A1 * | 3/2022 | Merani | A01G 9/28 |

FOREIGN PATENT DOCUMENTS

| | | | | |
|---|---|---|---|---|
| DE | 102008036857 | A1 * | 2/2010 | A01G 1/08 |
| GB | 504333 | A * | 9/1938 | |
| GB | 2499320 | A * | 8/2013 | A01G 1/08 |

* cited by examiner

MULTIPURPOSE BARRIER AND GARDENING SYSTEM FOR PLANTATION

CROSS-REFERENCE TO RELATED APPLICATION

The present application claims priority to, and the benefit of, U.S. Provisional Application No. 63/209,170, which was filed on Jun. 10, 2021 and is incorporated herein by reference in its entirety.

FIELD OF THE INVENTION

The present invention relates generally to the field of protecting trees, shrubs, plants, and flowers from damage. More specifically, the present invention relates to a barrier and gardening tool for forming a safe barrier around the base of a tree, plant, raised garden, or flower area. The tool has curved body portions or members that are fastened together using stakes to form a barrier of various shapes, such as, circular and semi-circular shapes, and more, for protecting plants from animals, wind, lawn cutting/trimming equipment, and more. The tool can be used as a single tier or multi-tiered system and offers a way for individuals to assemble a garden barrier area within minutes and provides protection for longevity. Accordingly, the present disclosure makes specific reference thereto. Nonetheless, it is to be appreciated that aspects of the present invention are also equally applicable to other like applications, devices, and methods of manufacture.

BACKGROUND

By way of background, plants, trees, and even saplings are used in landscapes and lawns for both, beautifying the surroundings and creating a clean and healthy environment. In fact, plants and trees form important elements in landscape designs and aid in reducing the air pollution of the environment and minimizing some of the effects of heat, sound, wind, air, and more. Often, trees, plants, saplings, flower areas, and more are damaged by small animals like rabbits, insects, and more, when the owner fails to provide a proper barrier around the trees and plants to protect the same from damage.

Plants and trees positioned along-side the roads and highways are prone to damage by vehicles. Even a slow speeding vehicle can easily hit a plant and tree and cause damage. Individuals desire a barrier system for protecting trees, plants, raised gardens, flower areas, and more from damage.

Often times, individuals do not plant trees, grow plants, prepare flower areas, etc., in places where animals, strong winds, and more can damage the trees, plants, and flowers. This results in wastage of space and lack of plantation and landscape. Individuals desire a barrier system that can protect their plantations, trees, and/or plants anywhere and allows individuals to effectively use space for landscaping by creating protected gardening areas.

Therefore, there exists a long-felt need in the art for a barrier system for protecting trees, flower areas, plants, vegetables, herbs, and more. There is also a long-felt need in the art for a garden and barrier system that creates protected gardening areas. Additionally, there is a long-felt need in the art for a tree barrier system that can be designed as a permanent or a temporary barrier. Moreover, there is a long-felt need in the art for a gardening tool that is assembled and positioned along or around a perimeter of a tree, plant, and garden area and can be disassembled when not required. Further, there is a long-felt need in the art for a gardening tool that can be assembled and installed quickly and easily for forming a safe barrier around a base of a tree, a raised garden, and more. Furthermore, there is a long-felt need in the art for a gardening tool that creates a single or a multi-tiered system to grow plants and to protect their roots. Finally, there is a long-felt need in the art for a barrier and garden system that allows individuals to assemble and create a protected garden area within minutes that can be relocated as needed.

The subject matter disclosed and claimed herein, in one embodiment thereof, comprises a gardening and barrier tool for forming a safe barrier around the base of a tree, plant, raised garden, and/or flower area. The tool also provides protected gardening space for growing flowers, shrubs, and more. The gardening tool includes at least two curved body portions or members having a pair of longitudinal edges, wherein said body portions or members are made from non-toxic and corrosion resistant material; a plurality of spaced slots disposed on said pair of longitudinal edges of said curved body portions or members; a plurality of stakes for fastening said curved body members together to form the gardening tool, wherein said stakes are passed through said spaced slots to form the circular barrier wherein the spaced slots of the terminal ends of the curved body portions or members can be aligned vertically enabling the stakes to easily pass therethrough.

In this manner, the novel gardening and barrier tool of the present invention accomplishes all of the foregoing objectives and provides users with a portable or permanent barrier and garden system for trees, plants, flowers, vegetables, herbs, and other plant life. The tool enables users to grow plants bounded within a temporary or permanent enclosure of various configurations.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a portable barrier and gardening system for protecting a trunk of a tree, shrubs, plants, and more and providing space for secure and bounded gardening. The system further comprising a first semi-circular body member having a pair of longitudinal edges, a top edge and a bottom edge; a second semi-circular body member having a pair of longitudinal edges, a top edge and a bottom edge; the longitudinal edges of the first semi-circular body member have a plurality of slots along the edges; the longitudinal edges of the second semi-circular body member have a plurality of corresponding (i.e., mating) slots to the plurality of slots of the first semi-circular body member; wherein the longitudinal edges of the first semi-circular body and the longitudinal edges of the second semi-circular body are fastened together using stakes, the stakes running across or through the slots of the first and second semi-circular body members to fasten the body portions or members together to form a circular barrier system; wherein, the stakes are fastened to the ground to secure the circular barrier system to the ground.

In yet another embodiment, the pair of longitudinal edges of the first semi-circular body member include a first edge and a second edge; the pair of longitudinal edges of the second semi-circular body member include a first edge and a second edge; wherein the first edge of the first semi-circular body member and the first edge of the second semi-circular body member are fastened together; and the second edge of the first semi-circular body member and the second edge of the second semi-circular body member are fastened together.

In yet another embodiment, the plurality of slots along the first edge of the first semi-circular body member and the plurality of slots along the first edge of the second semi-circular body member are positioned adjacently enabling the stake to pass through to the ground when said first edges are attached and fastened.

In yet another embodiment, the barrier and gardening system is a single tier system.

In yet another embodiment, the system is a multi-tier system.

In yet another embodiment, a gardening tool or barrier for forming a safe barrier around the base of a tree, raised garden, or flower area is disclosed. The gardening tool includes at least two curved body members having a pair of longitudinal edges, wherein said body members are made from non-toxic and corrosion resistant material; a plurality of spaced slots disposed on said pair of longitudinal edges of said curved body portions or members; a plurality of stakes for fastening said curved body portions or members together to form the gardening tool, wherein said stakes are passed through said spaced slots to form the circular barrier wherein the spaced slots of the curved body members are aligned vertically in a staggered arrangement thereby enabling the stakes to easily pass therethrough.

In yet another embodiment, a multi-tiered safe barrier around the base of a tree, plant, raised garden, or flower area is disclosed. The barrier includes an outer or first barrier layer; a middle or second barrier layer, wherein a height of the middle barrier layer is longer than a height of the outer layer and a diameter of the middle barrier is smaller than a diameter of the outer layer; an innermost or third barrier layer, wherein a height of the innermost barrier layer is longer than the height of the middle layer and a diameter of the innermost barrier is smaller than the diameter of the middle layer. Space between the outer barrier layer and the middle barrier layer and the space between the middle barrier layer and the innermost barrier layer are used for growing plants, shrubs, flowers and more, wherein a tree is supported inside the innermost barrier layer.

In yet another embodiment, the barrier has a plurality of flag holes for supporting small flags or other decorations.

In yet another embodiment, each layer has an exterior surface having a stone or brick texture.

In yet another embodiment, each layer has a decorative exterior surface.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1A:
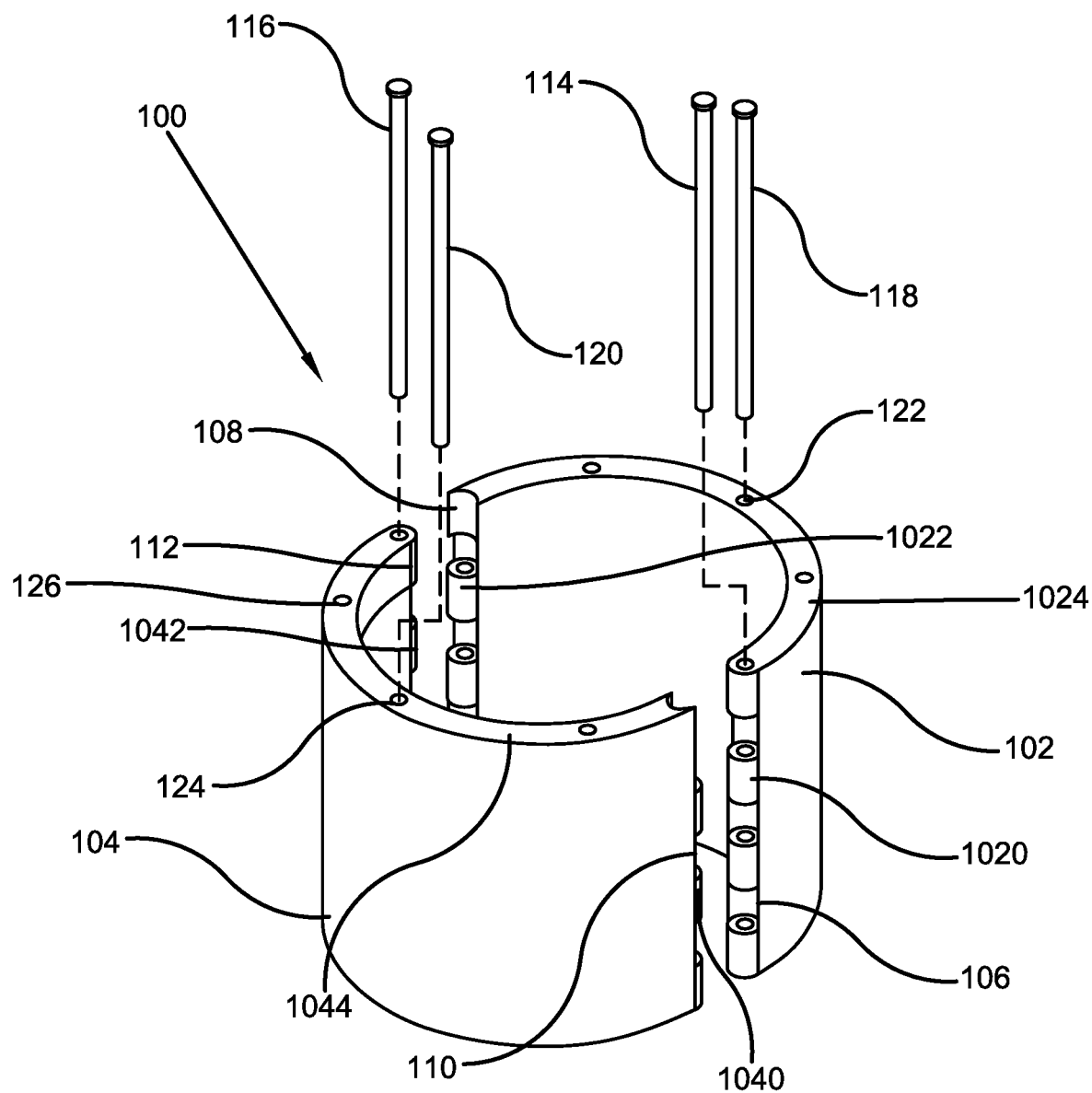
FIG. 1A illustrates a perspective view of one potential embodiment of the barrier and gardening tool of the present invention in an unassembled state in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for a barrier system for protecting trees, flower areas, plants, vegetables, herbs, and more. There is also a long-felt need in the art for a garden and barrier system that creates protected gardening areas. Additionally, there is a long-felt need in the art for a tree barrier system that can be designed as a permanent or a temporary barrier. Moreover, there is a long-felt need in the art for a gardening tool that is assembled and positioned along or around a perimeter of a tree, plant, and garden area and can be disassembled when not required. Further, there is a long-felt need in the art for a gardening tool that can be assembled and installed quickly and easily for forming a safe barrier around a base of a tree, a raised garden, and more. Furthermore, there is a long-felt need in the art for a gardening tool that creates a single or a multi-tiered system to grow plants and to protect their roots. Finally, there is a long-felt need in the art for a barrier and garden system that allows individuals to assemble and create a protected or bounded garden area within minutes that can be relocated as needed.

The present invention, in one exemplary embodiment, is a portable barrier and gardening system for protecting the trunk of a tree, shrubs and more and providing space for secure gardening. The system further comprising a first semi-circular body member having a pair of longitudinal edges; a second semi-circular body member having a pair of longitudinal edges; the longitudinal edges of the first semi-circular body member have a plurality of spaced slots along the edges; the longitudinal edges of the second semi-circular body member have a plurality of spaced slots corresponding to, or mating therewith, the plurality of slots of the first semi-circular body member; wherein the longitudinal edges of the first semi-circular body and the longitudinal edges of the second semi-circular body are fastened together using stakes, the stakes running across or through the aligned spaced slots of the first and second semi-circular body portions or members to fasten the body members to form a circular or semi-circular barrier system wherein the stakes are fastened to the ground to secure the circular barrier system to the ground.

Referring initially to the drawings, FIG. 1A illustrates a perspective view of one potential embodiment of the barrier and gardening tool of the present invention in an unassembled state in accordance with the disclosed architecture. The barrier and gardening tool 100 of the present embodiment can be arranged as a single tier barrier system and functions as a protective barrier to prevent damage to trees, plants, and more and specifically roots. The barrier system 100 is a circular or semi-circular structure that can be arranged in a full circle or a semi-circle for bounding a portion of a tree trunk and roots up to three hundred sixty degrees therearound.

The barrier 100 has at least two semicircular body portions or members 102,104 that are fastened together and fastened to the ground using stakes for providing protection to a tree, a plant, and more. As illustrated, the first portion/body member 102 has a plurality of first slots 1020 along first longitudinal edge 106 and a plurality of second slots 1022 along the second longitudinal edge 108. The second portion/body member 104 has a plurality of first slots 1040 along first longitudinal edge 110 and a plurality of second slots 1042 along second longitudinal edge 112. For forming the circular barrier, the first longitudinal edge 106 of the first portion 102 is positioned to fit to the first longitudinal edge 110 of the second portion 104, such that the first plurality of slots 1020 are adjacently positioned to the first plurality of slots 1040 and a stake 114 is passed through the slots 1020,1040 to fasten the portions 102,104 together.

Similarly, the second longitudinal edge 108 of the first portion 102 is fastened to the second longitudinal edge 112 of the second portion 104 by passing a second stake 114 through the plurality of slots 1022,1042. The fastened portions 102,104 form the circular barrier as illustrated in FIG. 1B circumscribing or bounding a portion of a tree.

For providing additional support to the barrier 100, a pair of additional stakes 118,120 are provided. The third stake 118 is used for fastening the first portion 102 into the ground and passing through a continuous hole 122 disposed in the first portion 102. Alternatively, the stake 118 can be used for anchoring a first portion 102 on one level to a first portion 102 of another level in stacked arrangement. A fourth stake 120 is used for fastening the second portion 104 into the ground and passing through a continuous hole 124 disposed in the second portion 104. Similarly, the stake 120 can be used for anchoring one portion on one level to another portion of another level in a stacked arrangement.

Each of the semi-circular portions 102,104 has a plurality of flag holes 126 along the corresponding top edges 1024, 1044 for adding flags and other small decorations to the barrier system.

Figure 1B:
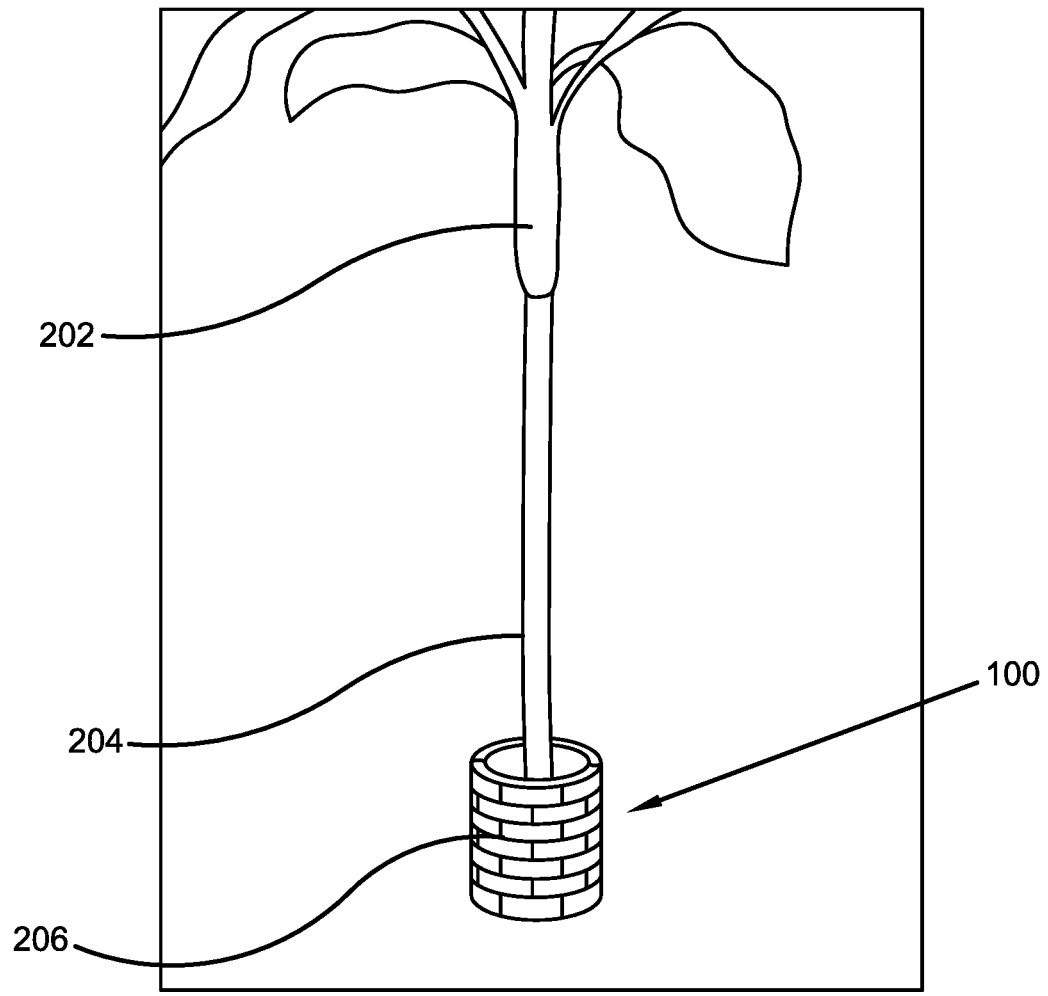
FIG. 1B illustrates a perspective view of the single tier barrier system of FIG. 1A in an assembled state and protecting and supporting a tree in accordance with the disclosed architecture.

FIG. 1B illustrates a perspective view of the single tier barrier system of FIG. 1A in an assembled state and protecting and supporting a tree in accordance with the disclosed architecture. The single tier barrier 100 is assembled around a tree 202 in a manner described in FIG. 1A for supporting and protecting a portion of trunk 204 of the tree 202. The barrier 100 can have a height in the range of about 4" to about 48" depending on the requirements, diameter, and length (i.e., height) of tree 202. The barrier 100 also supports tree growth and areas of ground inside the barrier 100 and can also be used for securely growing flowers and shrubs therein. It is to be appreciated that the tier barrier 100 can include a multi-tier arrangement (refer to FIG. 3) and/or a multi-level arrangement of individual barrier portions or members in a stacked arrangement wherein an upper level can be anchored to a lower level.

The exterior surface 206 of the barrier 100 is smooth enabling application of a decorative applique. Alternatively, the exterior surface 206 can have any texture including, but not limited to, a stone or a brick texture. Further, it will be appreciated by those skilled in the art that the barrier 100 can be available in a number of different colors to blend into the surroundings or to compliment the aesthetic tastes of a user.

The barrier 100 can be permanently or removably placed around the tree 202 and can be constructed using flexible plastic, rigid plastic, metal, and other suitable non-toxic and corrosion resistant materials.

Figure 2:
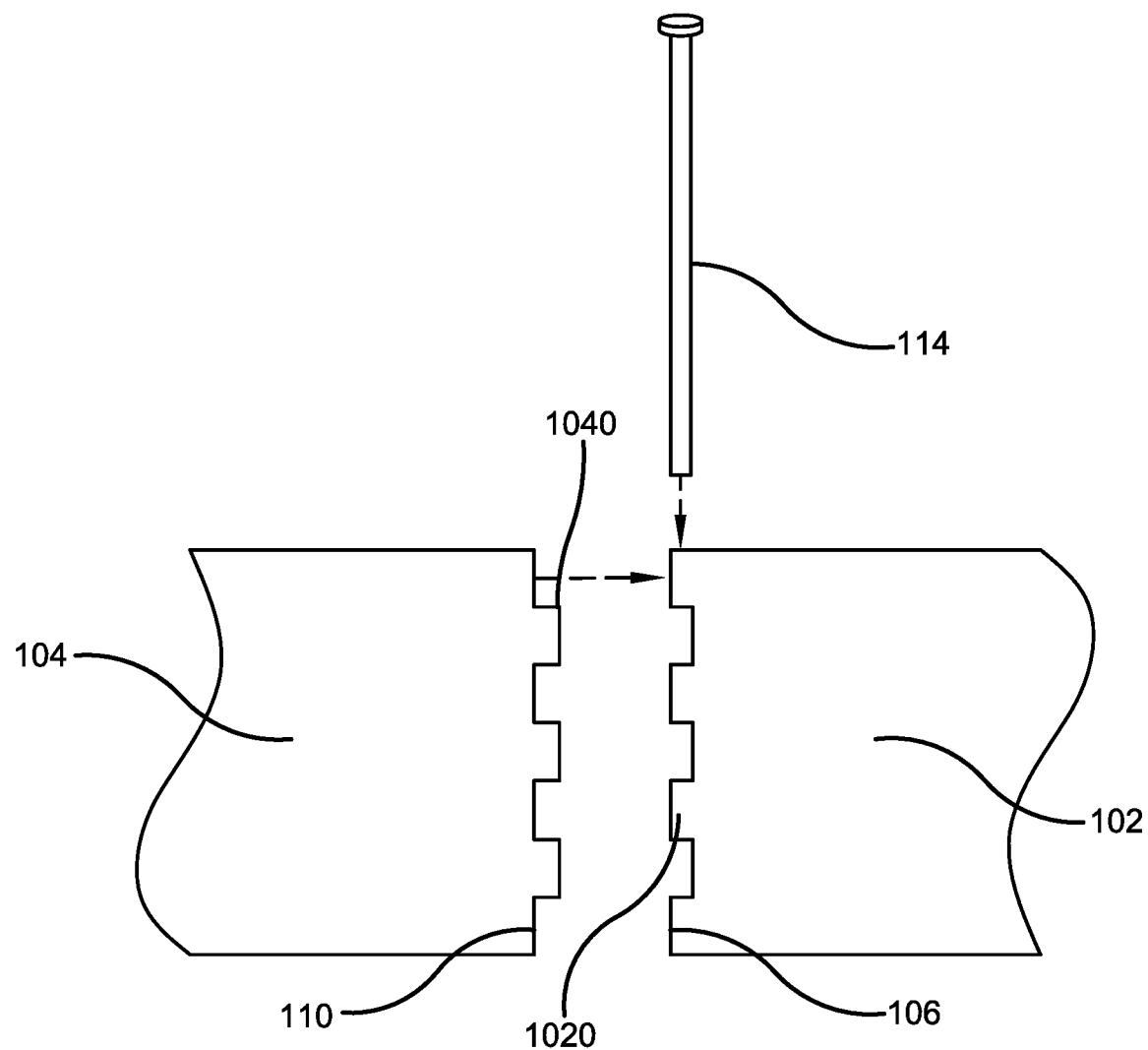
FIG. 2 illustrates a planar view showing the fastening of the semi-circular portions together along their longitudinal edges to form one potential embodiment of the circular barrier and gardening system of the present invention in accordance with the disclosed architecture.

FIG. 2 illustrates a planar view showing the fastening of the semi-circular portions together along their longitudinal edges to form the circular barrier and gardening system in accordance with the disclosed architecture. The plurality of slots 1020 along the edge 106 of the first portion 102 and the corresponding plurality of slots 1040 along the edge 110 of the second portion 104 are designed and positioned such that the slots 1020,1040 are positioned alternatively and adjacently (i.e., matingly) to each other when the edges 106,110 are attached to each other enabling a stake 114 to easily pass through the slots 1020,1040 to releasably fasten the portions 102,104 together and also to fasten or secure the portions 102,104 to the ground or to a lower level of portions.

The other set of plurality of slots are attached and fastened in a similar manner enabling the formation of the circular barrier. It should be noted that the stakes are used in a manner described in the present embodiment in all variants of the barrier and garden system described in the present disclosure for protecting trees, plants, and more and for providing a barrier gardening system.

Figure 3:
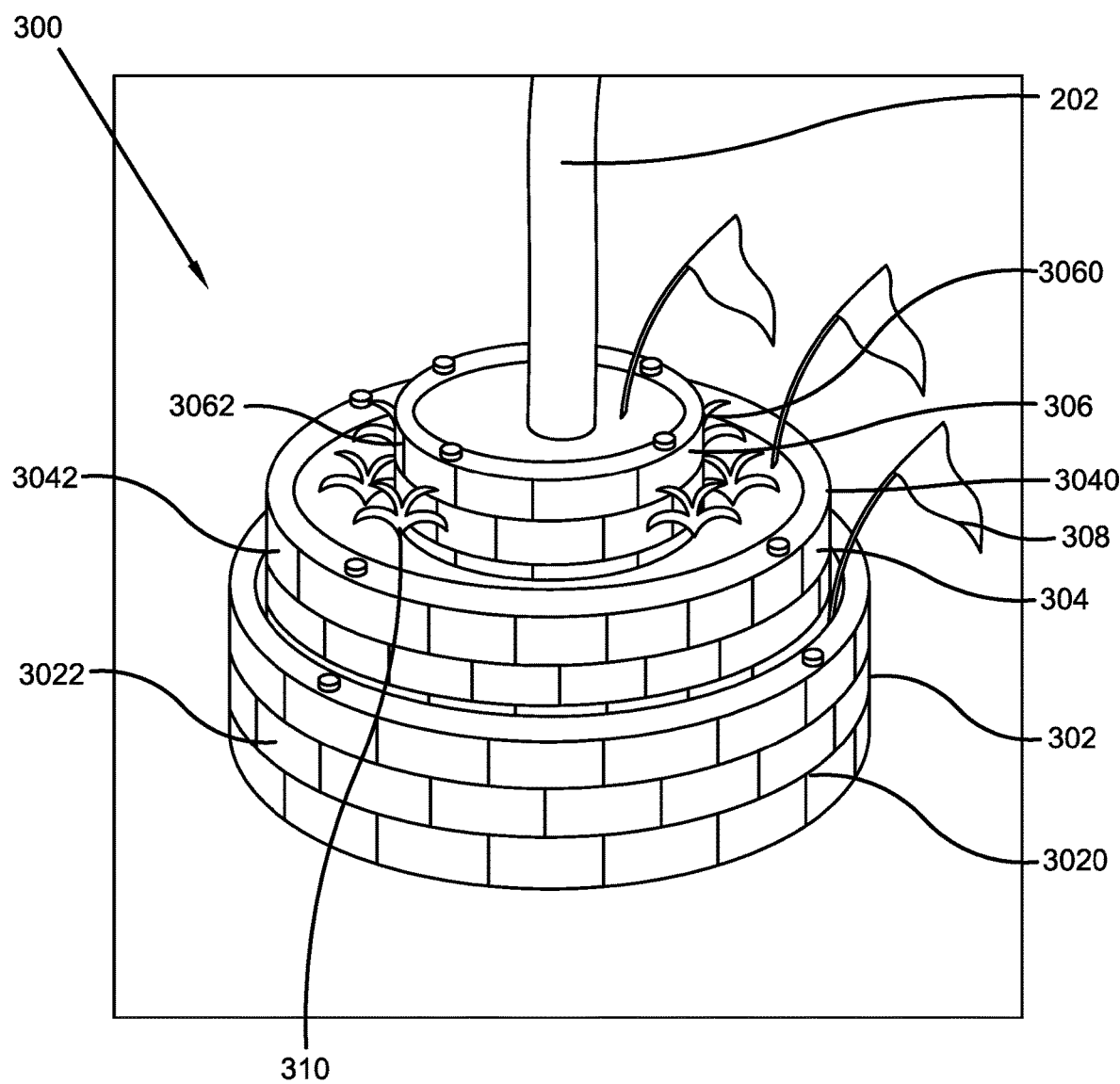
FIG. 3 illustrates a perspective view of one potential embodiment of the multi-tier barrier and gardening tool of the present invention for protecting a tree and providing gardening space in accordance with the disclosed architecture.

FIG. 3 illustrates a perspective view of a multi-tier barrier and gardening tool of the present invention for protecting a tree and for providing gardening space in accordance with the disclosed architecture. In the present embodiment, a three-tiered gardening tool 300 is formed using circular barriers of different sizes. More specifically, a bottom tier 302 is formed by using at least two semi-circular portions 3020,3022. The semi-circular portion 3020,3022 can include larger diameters, larger lengths, and/or shorter heights than another tier of barrier to create the largest gardening and bounded area or perimeter.

A middle tier barrier structure 304 has a height of about 150% of the height of the bottom tier 302 and has a diameter less than that of the bottom tier 302. The middle tier 304 is formed from semi-circular portions 3040,3042 fastened using stakes and allows a user to grow grass, flowers, or more in the space between the bottom tier 302 and middle tier 304. It should be noted that the bottom tier 302 and the middle tier 304 are in the form of concentric circles with the bottom tier 302 forming the exterior circle and the middle tier 304 forming an inner circle.

For supporting the tree 202 and for providing additional gardening 310, a third barrier tier 306 is formed and placed inside the middle tier 304. The innermost barrier tier 306 has a height greater than both the middle tier 304 and the bottom tier 302 and further, can be used for filling sand and for performing gardening to grow grass and flowers in addition to providing support to the tree 202.

It should be noted that the multi-tiered barrier system such as the three-tiered system 300 may be available commercially or can alternatively be prepared by a user by using barrier systems of different diameters, lengths, and heights. Each independent barrier system layer is fastened using the stakes as described in other embodiments of the present invention and provides slots for accommodating flags 308 or other garden art.

Figure 4:
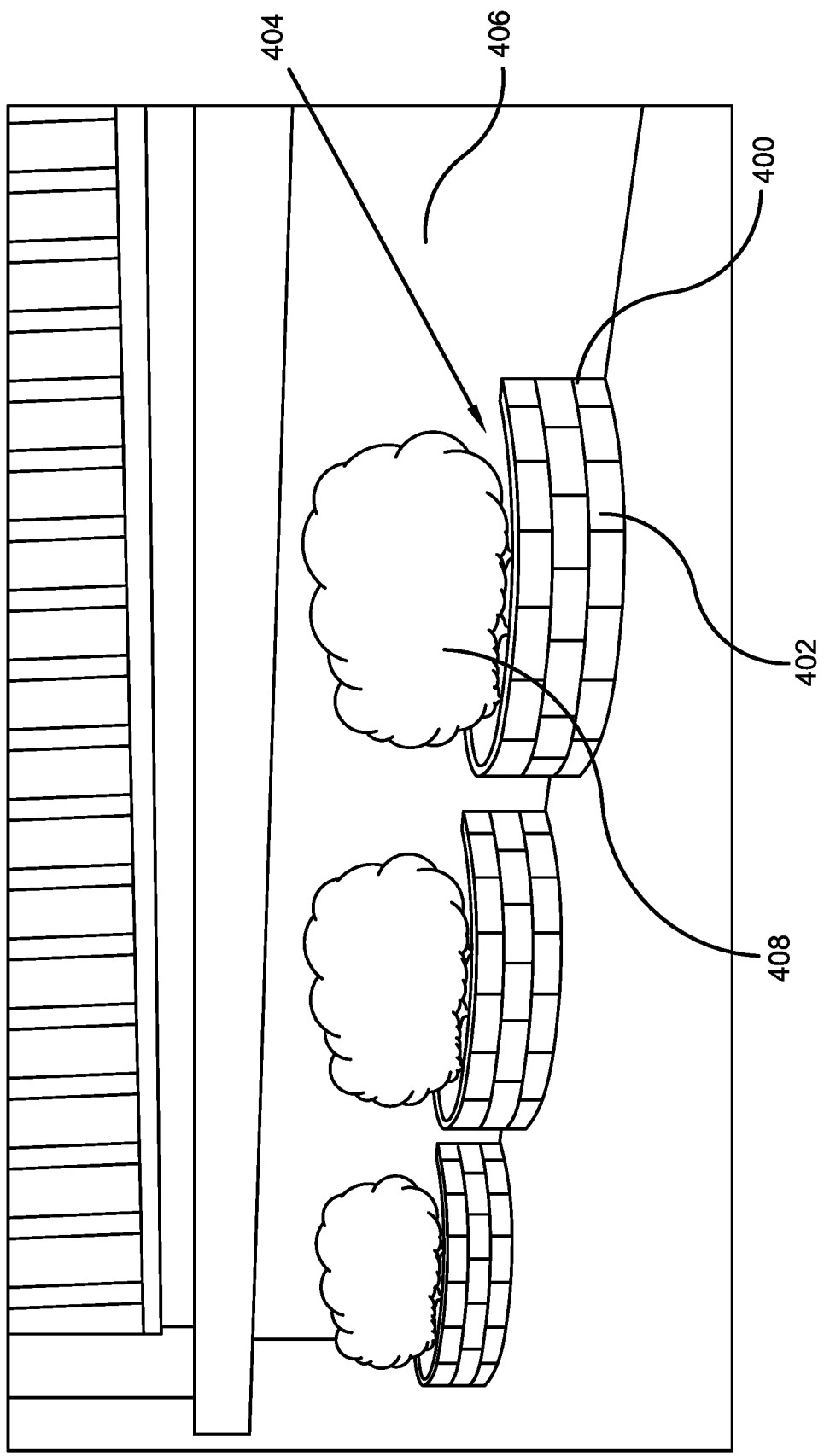
FIG. 4 illustrates a perspective view showing another potential embodiment of the barrier and gardening system of the present invention used along the side of a wall of a home in accordance with the disclosed architecture.

FIG. 4 illustrates a perspective view showing another embodiment of the barrier and gardening system of the present invention used along the side of a wall of a home in accordance with the disclosed architecture. In the present embodiment, the barrier and gardening system 400 is installed in a semi-circular shape 402 with the open end 404 positioned along the wall 406. The height of the system 400 can be customized as per requirements of a user for providing effective gardening space for growing the flower area 408. The barrier 400 protects the flower area 408 from small animals, wind, lawn cutting equipment, and other debris. The curvature, length, and size of the system 400 can be customized to develop and protect flower areas and gardening areas.

Figure 5:
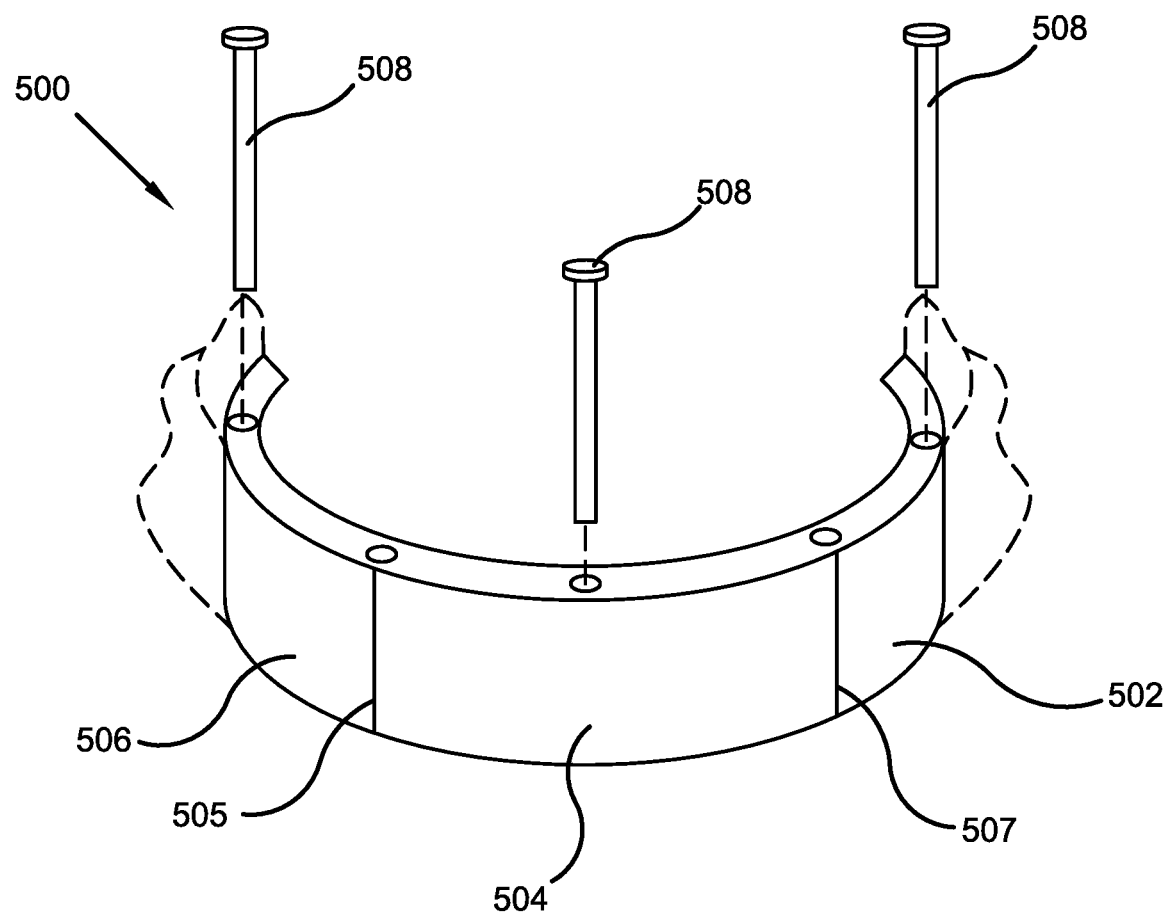
FIG. 5 illustrates a perspective view of yet another potential embodiment of the improved gardening and barrier tool of the present invention in accordance with the disclosed architecture.

FIG. 5 illustrates a perspective view of yet another embodiment of the improved gardening and barrier tool of the present invention in accordance with the disclosed architecture. In the present embodiment, the barrier 500 has at least three curved/arcuate portions 502,504,506 that can be fastened to form the gardening and barrier tool 500. Each of the curved portions includes slots 505,507 along each longitudinal edge as described in FIG. 1 for fastening to each other and to the ground. Additional stakes 508 are used for securing the portions 502,504,506 to the ground thereby enabling individuals to assemble a garden area within minutes with protection from animals, wind, equipment, and more. It is to be appreciated that the length of the stakes 508 are greater than the height of the barrier portions 502,504, 506 to provide an anchor into the ground.

The gardening and barrier device of various embodiments of the present invention allows for quick assembly and installation with minimal effort or tools, supports tree growth and allows for an area around the trees to be filled with additional flowers or shrubs. The device/system can be created as a single tiered or a multi-tiered barrier with any number of fastened body portions or members to form the desired shape, diameter, and size. The device also protects the tree and shrubs from lawn mowers, trimmers, and other gardening tools. The device also provides segregation from competitive weeds.

The barrier system of various embodiments of the present invention may come in a variety of colors, sizes, and materials and can be used with any landscape, lawn and more. Any conventional manufacturing and molding techniques can be implemented to manufacture the barrier system.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "gardening and barrier tool", "barrier system", "barrier and gardening tool", and "barrier" are interchangeable and refer to the barrier and garden system 100, 300, 400, 500 of the present invention.

Notwithstanding the foregoing, the barrier and garden system 100, 300, 400, 500 of the present invention can be of any suitable size and configuration as is known in the art without affecting the overall concept of the invention, provided that it accomplishes the above-stated objectives. One of ordinary skill in the art will appreciate that the barrier and garden system 100, 300, 400, 500 as shown in the FIGS. are for illustrative purposes only, and that many other sizes and shapes of the barrier and garden system 100, 300, 400, 500 are well within the scope of the present disclosure. Although the dimensions of the barrier and garden system 100, 300, 400, 500 are important design parameters for user convenience, the barrier and garden system 100, 300, 400, 500 be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A barrier and gardening boundary tool comprising:
   a plurality of barrier portions arranged as a first tier, wherein said plurality of barrier portions form at least a semi-circular structure for protection of a plant therein;
   wherein each of said plurality of barrier portions comprises a first terminal edge, a second terminal edge, a pair sides, a top edge, a bottom edge, at least one stake hole penetrating said barrier portion from top to bottom, and a plurality of flag holes penetrating the top edge;

wherein said first terminal edge and said second terminal edge each comprise a plurality of slots extending from and in line with said first and second terminal edges;

wherein said plurality of slots from said first terminal edge of a first barrier portion matingly engageable with a plurality of slots from said first terminal edge of a second barrier portion;

wherein said mating slots interlock to form a continuous first hole passing therethrough for receiving a first stake therein;

wherein said first stake fastens said first terminal edge of said first barrier portion to said first terminal edge of said second barrier portion; and further wherein at least a second stake passing through the at least one stake hole of at least one of said plurality of barrier portions for fastening said first tier to the ground.

2. The barrier and gardening boundary tool of claim 1, wherein said first tier is a circular structure for protection of the plant therein.

3. The barrier and gardening boundary tool of claim 2, wherein said plurality of barrier portions comprise two barrier portions.

4. The barrier and gardening boundary tool of claim 2, wherein said plurality of barrier portions comprise at least three barrier portions.

5. The barrier and gardening boundary tool of claim 2, wherein each said plurality of barrier portions comprise at least another hole passing therethrough for receiving another stake therein for fastening said plurality of barrier portions to the ground.

6. The barrier and gardening boundary tool of claim 2, further comprising a second plurality of barrier portions arranged as a second tier, wherein each of said second plurality of barrier portions comprises at least another hole passing therethrough for receiving another stake therein.

7. The barrier and gardening boundary tool of claim 6, wherein said first tier includes a first diameter and said second tier includes a second diameter, and further wherein said first diameter is the same as said second diameter.

8. The barrier and gardening boundary tool of claim 6, further comprising a third plurality of barrier portions arranged as a third tier, wherein each of said third plurality of barrier portions comprises at least another hole passing therethrough for receiving another stake therein.

9. The barrier and gardening boundary tool of claim 8, wherein said first tier includes a first diameter and said second tier includes a second diameter, and further wherein said first diameter is greater than said second diameter.

10. The barrier and gardening boundary tool of claim 9, wherein said first tier includes a first height and said second tier includes a second height, and further wherein said first height is less than said second height.

11. A barrier and gardening boundary tool comprising:
a plurality of barrier portions arranged as a first tier, wherein said plurality of barrier portions form a circular structure for protection of a plant therein;
wherein each of said plurality of barrier portions comprises a first terminal edge, a second terminal edge, a pair sides, a top edge, a bottom edge, at least one stake hole penetrating said barrier portion from top to bottom, and at least one flag hole penetrating the top edge, and wherein each of said first and second terminal edges comprises a plurality of slots extending from and in line with said first and second terminal edges;

wherein said plurality of slots from said first terminal edge of a first barrier portion matingly engageable with a plurality of slots from said first terminal edge of a second barrier portion;

wherein said mating slots interlock to form a continuous first hole passing therethrough for receiving a first stake therein;

said first stake fastens said first terminal edge of said first barrier portion to said first terminal edge of said second barrier portion;

a plurality of ground stakes passing through the at least one stake hole of each of said plurality of barrier portions for fastening said first tier to the ground;

wherein a length of each ground stake is greater than a height of said plurality of barrier portions; and wherein said plurality of barrier portions include at least two barrier portions; and wherein an exterior surface of each barrier portion comprises a plurality of colored appliques.

12. The barrier and gardening boundary tool of claim 11, wherein said plurality of barrier portions comprise a material selected from a group consisting of a flexible plastic, a rigid plastic, and a metal.

13. The barrier and gardening boundary tool of claim 11, further comprising a second plurality of barrier portions arranged as a second tier, wherein each of said second plurality of barrier portions comprises at least another hole passing therethrough for receiving another stake therein.

14. The barrier and gardening boundary tool of claim 13, wherein said first tier includes a first diameter and said second tier includes a second diameter, and further wherein said first diameter is the same as said second diameter.

15. The barrier and gardening boundary tool of claim 14, further comprising a third plurality of barrier portions arranged as a third tier, wherein each of said third plurality of barrier portions comprises at least another hole passing therethrough for receiving another stake therein.

16. The barrier and gardening boundary tool of claim 15, wherein said third tier comprises a third diameter, and further wherein said second diameter is greater than said third diameter.

17. The barrier and gardening boundary tool of claim 16, wherein said first tier includes a first height and said second tier includes a second height, and further wherein said first height is less than said second height.

18. A barrier and gardening boundary tool comprising:
a first plurality of barrier portions arranged as a first tier;
a second plurality of barrier portions arranged as a second tier, wherein a height of each second barrier portion is 150 percent of a height of each first barrier portion; and
a third plurality of barrier portions arranged as a third tier;
wherein each of said first, second and third tiers form a circular structure for protection of a plant therein;
wherein each of said first, second and third plurality of barrier portions comprise a first terminal edge, a second terminal edge, a pair sides, a top edge, a bottom edge, a plurality of stake holes penetrating said barrier portion from top to bottom, a plurality of flag holes spaced along and penetrating the top edge of said barrier portion, and a decorative applique applied to an exterior surface of said barrier portion;
wherein each of said first terminal edge and said second terminal edge comprises a plurality of slots extending from and in line with said first and second terminal edges;

wherein said plurality of slots from said first terminal edge of a first barrier portion matingly engageable with a plurality of slots from said first terminal edge of a second barrier portion;

wherein said mating slots interlock to form a continuous first hole passing therethrough for receiving a first stake therein;

wherein said first stake fastens said first terminal edge of said first barrier portion to said first terminal edge of said second barrier portion;

a plurality of ground stakes passing through the plurality of stake holes each of said plurality of barrier portions for fastening said first tier, said second tier, and said third tier to the ground; and further wherein each of said first, second and third tiers comprise at least two barrier portions.

19. The barrier and gardening boundary tool of claim 18, wherein said plurality of barrier portions comprise a material selected from a group consisting of a flexible plastic, a rigid plastic, and a metal.

20. The barrier and gardening boundary tool of claim 18, wherein said first tier includes a first diameter, said second tier includes a second diameter, and said third tier includes a third diameter; and further wherein said first diameter is greater than said second diameter and said second diameter is greater than said third diameter.

\* \* \* \* \*